US011750632B2

(12) United States Patent
Doron et al.

(10) Patent No.: US 11,750,632 B2
(45) Date of Patent: Sep. 5, 2023

(54) METHOD AND SYSTEM FOR DETECTING AND MITIGATING HTTPS FLOOD ATTACKS

(71) Applicant: RADWARE LTD., Tel Aviv (IL)

(72) Inventors: Ehud Doron, Modiin (IL); Lev Medvedovsky, Netanya (IL); David Aviv, Tel Aviv (IL); Eyal Rundstein, Givataim (IL); Ronit Lubitch Greenberg, Tel Aviv (IL); Avishay Balderman, Tel Aviv (IL)

(73) Assignee: RADWARE, LTD., Tel Aviv (IL)

( * ) Notice: Subject to any disclaimer, the term of this patent is extended or adjusted under 35 U.S.C. 154(b) by 0 days.

(21) Appl. No.: 17/804,725

(22) Filed: May 31, 2022

(65) Prior Publication Data

US 2022/0294814 A1 Sep. 15, 2022

Related U.S. Application Data

(63) Continuation of application No. 16/453,035, filed on Jun. 26, 2019, now Pat. No. 11,363,044.

(51) Int. Cl.
*H04L 9/40* (2022.01)

(52) U.S. Cl.
CPC ...... *H04L 63/1425* (2013.01); *H04L 63/1458* (2013.01)

(58) Field of Classification Search
CPC .................. H04L 63/1425; H04L 63/1458
See application file for complete search history.

(56) References Cited

U.S. PATENT DOCUMENTS

| | | | |
|---|---|---|---|
| 7,617,170 B2 | 11/2009 | Chesla | |
| 8,438,639 B2 | 5/2013 | Lee et al. | |
| 9,154,516 B1* | 10/2015 | Vaystikh | ............. H04L 63/1425 |
| 9,294,502 B1 | 3/2016 | Benishti | |
| 9,781,157 B1* | 10/2017 | Gerlach | ............. H04L 63/0254 |
| 10,270,794 B1 | 4/2019 | Mukeiji et al. | |

(Continued)

OTHER PUBLICATIONS

U.S. Appl. No. 16/721,186 dated Dec. 19, 2019, Lev Medvedovsky, Entire Document.

(Continued)

*Primary Examiner* — Stephen T Gundry
(74) *Attorney, Agent, or Firm* — M&B IP Analysts, LLC

(57) ABSTRACT

A method for detecting DoS attacks using an encrypted communication protocol includes estimating traffic telemetries of packets of at least ingress traffic passing over an insecure network that is directed to a protected entity by analyzing TCP headers of the packets, the packets using an encrypted version of a non-encrypted communication protocol, the packets being intended for the protected entity; providing at least one rate-based feature and at least one rate-invariant feature based on the estimated traffic telemetries, wherein the rate-based feature and the rate-invariant feature demonstrate a normal behavior of the traffic; and executing a mitigation action when a potential flood DoS attack using the encrypted communication protocol is detected by an evaluation of each of the at least one rate-based feature and the at least one rate-invariant feature with respect to respective baselines to determine whether the behavior of the ingress traffic indicates a potential flood DoS attack.

21 Claims, 4 Drawing Sheets

(56) References Cited

U.S. PATENT DOCUMENTS

| | | |
|---|---|---|
| 10,511,624 B2 | 12/2019 | Holloway et al. |
| 10,516,695 B1 | 12/2019 | Evans |
| 10,728,280 B2 | 7/2020 | Reddy et al. |
| 10,764,313 B1 | 9/2020 | Mushtaq |
| 10,931,692 B1 | 2/2021 | Mota et al. |
| 11,102,239 B1* | 8/2021 | Sareshwala ............ H04L 63/166 |
| 11,457,040 B1* | 9/2022 | Sole ....................... H04L 63/101 |
| 2006/0107318 A1 | 5/2006 | Jeffries et al. |
| 2008/0086434 A1* | 4/2008 | Chesla ................ H04L 63/1458 |
| | | 706/12 |
| 2011/0099622 A1 | 4/2011 | Lee et al. |
| 2012/0174196 A1 | 7/2012 | Bhogavilli et al. |
| 2015/0207806 A1 | 7/2015 | Be'ery et al. |
| 2015/0237527 A1 | 8/2015 | Knutson |
| 2016/0164912 A1 | 6/2016 | Fante |
| 2017/0223049 A1 | 8/2017 | Kuperman et al. |
| 2018/0007084 A1 | 1/2018 | Reddy et al. |
| 2018/0034854 A1 | 2/2018 | Gong et al. |
| 2018/0046811 A1 | 2/2018 | Andriani |
| 2018/0307833 A1* | 10/2018 | Noeth .................... H04L 43/062 |
| 2019/0020663 A1 | 1/2019 | Bartos et al. |
| 2019/0068624 A1 | 2/2019 | Compton |
| 2019/0098043 A1 | 3/2019 | Banerjee et al. |
| 2019/0104151 A1 | 4/2019 | Cheng et al. |
| 2019/0158533 A1 | 5/2019 | Holloway et al. |
| 2019/0245866 A1* | 8/2019 | Anderson ............ H04L 63/1425 |
| 2019/0288984 A1 | 9/2019 | Hajduczenia |
| 2020/0076832 A1 | 3/2020 | Jusko et al. |
| 2020/0120107 A1 | 4/2020 | McGrew et al. |
| 2020/0137112 A1 | 4/2020 | Compton |
| 2020/0204574 A1* | 6/2020 | Christian ................. H04L 63/12 |
| 2020/0204580 A1 | 6/2020 | Konda et al. |
| 2021/0029156 A1* | 1/2021 | Sharifi Mehr ........ H04L 67/303 |
| 2021/0075766 A1* | 3/2021 | Kane .................... H04L 63/0281 |
| 2021/0194903 A1 | 6/2021 | Medvedovsky et al. |
| 2021/0273953 A1* | 9/2021 | Fellows ................. G06F 21/554 |
| 2021/0344573 A1* | 11/2021 | McGrew ................. H04L 41/28 |
| 2021/0349996 A1* | 11/2021 | McGrew ............. G06F 21/566 |
| 2021/0377283 A1* | 12/2021 | Anderson ............. H04L 63/145 |
| 2021/0392111 A1* | 12/2021 | Sole .................... H04L 63/0236 |
| 2022/0086064 A1* | 3/2022 | Sivaraman ............... H04L 67/12 |
| 2022/0116369 A1* | 4/2022 | Moore ................ H04L 63/0464 |
| 2022/0201042 A1* | 6/2022 | Crabtree ............. G06F 16/2477 |
| 2022/0210200 A1* | 6/2022 | Crabtree ............... G06F 16/951 |
| 2022/0224723 A1* | 7/2022 | Crabtree ............. G06F 16/2477 |
| 2022/0353285 A1* | 11/2022 | Savalle ............... H04L 63/1425 |
| 2022/0368676 A1* | 11/2022 | Shribman ........... G06F 16/9574 |

OTHER PUBLICATIONS

Litwin, L. "FIR and IIR Digital Filters", IEEE Potencials, vol. 19, No. 4, pp. 28-31, Oct.-Nov. 2000, doi: 10.1109/45.877863.

* cited by examiner

METHOD AND SYSTEM FOR DETECTING AND MITIGATING HTTPS FLOOD ATTACKS

CROSS-REFERENCE TO RELATED APPLICATIONS

This application is a continuation of co-pending U.S. patent application Ser. No. 16/453,035 filed on Jun. 26, 2019, which is incorporated herein by reference.

TECHNICAL FIELD

This present disclosure generally relates to techniques for protecting network and computing resources from attacks performed using cryptographic protocols, and specifically for detecting and mitigating HTTPS flood attacks.

BACKGROUND

These days on-line businesses and organizations are vulnerable to malicious attacks. Recently, cyber-attacks have been committed using a wide arsenal of attack techniques and tools targeting both the information maintained by the on-line businesses and their IT infrastructure. Hackers and attackers are constantly trying to improve their attack strategies to cause irrecoverable damage, overcome current deployed protection mechanisms, and so on.

For example, recently identified attacks were committed through cryptographic protocols including, but not limited to: transport layer security (TLS), secure socket layer (SSL), Hyper Text Transfer Protocol Secure (HTTPS), and the like. An example, for such attacks is the encrypted denial-of service (DoS) or encrypted distributed DoS (DDoS) attacks.

Typically, a DoS/DdoS attack is an attempt to make a computer or network resource unavailable or idle. A common technique for executing DoS/DdoS attacks includes saturating a target victim resource (e.g., a computer, a WEB server, an API server, a WEB application, and the like), with external requests. As a result, the target victim becomes overloaded, thus it cannot respond properly to legitimate traffic. When the attacker sends many applicative, or other, requests to a single network adapter, each victim resource would experience effects from the DoS attack. A DdoS attack is performed by controlling many machines and directing them to attack as a group. Various techniques for mitigating non-encrypted DoS/DdoS attacks are discussed in the related art. However, there are no efficient solutions for detecting application-layer encrypted DoS/DdoS attacks.

An encrypted DoS/DdoS is performed against victim resources having an encrypted connection with their clients or over an encrypted communication protocol. An example for the encrypted DoS/DdoS is an HTTPS flood attack, as it is based on HTTP communications over a TLS/SSL encryption protocol.

In the HTTPS flood attacks, attackers manipulate HTTP GET and POST unwanted requests in order to attack, or to overload, a victim resource. These attacks often use interconnected computers that have been taken over with the aid of malware, such as Trojan Horses as part of an organized BOTNET. HTTPS flood attacks require less bandwidth to attack the targeted sites or servers, because they target victim resources, not the networking infrastructure itself. For this reason, the HTTPS floods are more difficult to detect using simple means. HTTPS flood attacks are one of the most advanced threats facing web servers today as it is difficult to distinguish between legitimate and malicious HTTPS traffic.

HTTPS flood attacks cannot be detected and mitigated by mere use of the conventional techniques for mitigating non-encrypted DoS/DdoS attacks. This is due to the fact that current detection techniques typically are not adapted to decrypt the encrypted traffic as this typically requires private encryption keys and computing power that is able to decrypt information encapsulated in the headers of transported HTTP packets. In addition, the need to constantly decrypt high volumes of traffic might, by itself, lead to denial of service conditions.

Further, since HTTPS flood attacks employ legitimate-appearing requests with or without high volumes of traffic, it is difficult to differentiate such requests from valid traffic. Thus, such types of DdoS attacks are among the most advanced non-vulnerable security challenges facing servers and applications today.

During the last couple of years, the majority of Internet services have been based on encrypted WEB traffic, e.g., HTTPS. The inability to detect and mitigate HTTPS flood attacks significantly impacts online businesses that use cryptographic protocols. Such attacks greatly exploit the computing resources because encrypted traffic requires more resources for processing. For example, decryption of encrypted traffic by a targeted server consumes more CPU resources than the processing of a non-encrypted traffic. Thus, even a "small scale" encrypted attack can cause a targeted server to become unresponsive.

It would be, therefore, advantageous to provide an efficient security solution for detecting and mitigating attacks of HTTPS flood attacks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for detecting denial-of-service (DoS) attacks using an encrypted communication protocol. The method comprises: estimating traffic telemetries of packets of at least ingress traffic passing over an insecure network that is directed to a protected entity by analyzing transmission control protocol (TCP) headers of the packets, the packets of the at least ingress traffic being secured using an encrypted version of a non-encrypted communication protocol, the packets of the at least ingress traffic being intended for the protected entity; providing at least one rate-based feature and at least one rate-invariant feature based on the estimated traffic telemetries, wherein the rate-based feature and the rate invariant feature demonstrate a normal behavior of the traffic using the encrypted protocol intended for the protected entity; and executing a mitigation action when a potential flood DoS attack using the encrypted communication protocol is detected by an evaluation of the at least one rate-based feature and the at least one rate-invariant feature to determine whether the behavior of the ingress traffic intended for the protected entity indicates a potential flood DoS attack using the encrypted communication protocol, wherein the evaluation of the at least one rate-based feature is with respect to at least a first baseline and the evaluation of the at least one rate invariant feature is with respect to at least a second baseline.

Some embodiments disclosed herein include a non-transitory computer readable medium having stored thereon instructions for causing a processing circuitry to execute a process for detecting denial-of-service (DoS) attacks using an encrypted communication protocol, comprising: estimating traffic telemetries of packets of at least ingress traffic passing over an insecure network that is directed to a protected entity by analyzing transmission control protocol (TCP) headers of the packets, the packets of the at least ingress traffic being secured using an encrypted version of a non-encrypted communication protocol, the packets of the at least ingress traffic being intended for the protected entity; providing at least one rate-based feature and at least one rate-invariant feature based on the estimated traffic telemetries, wherein the rate-based feature and the rate invariant feature demonstrate a normal behavior of the traffic using the encrypted protocol intended for the protected entity; and executing a mitigation action when a potential flood DoS attack using the encrypted communication protocol is detected by an evaluation of the at least one rate-based feature and the at least one rate-invariant feature to determine whether the behavior of the ingress traffic intended for the protected entity indicates a potential flood DoS attack using the encrypted communication protocol, wherein the evaluation of the at least one rate-based feature is with respect to at least a first baseline and the evaluation of the at least one rate invariant feature is with respect to at least a second baseline.

Some embodiments disclosed herein include a system for detecting denial-of-service (DoS) attacks using an encrypted communication protocol, comprising: a processing circuitry; and a memory, the memory containing instructions that, when executed by the processing circuitry, configure the system to: estimate traffic telemetries of packets of at least ingress traffic passing over an insecure network that is directed to a protected entity by analyzing transmission control protocol (TCP) headers of the packets, the packets of the at least ingress traffic being secured using an encrypted version of a non-encrypted communication protocol, the packets of the at least ingress traffic being intended for the protected entity; provide at least one rate-based feature and at least one rate-invariant feature based on the estimated traffic telemetries, wherein the rate-based feature and the rate invariant feature demonstrate a normal behavior of the traffic using the encrypted protocol intended for the protected entity; and execute a mitigation action when a potential flood DoS attack using the encrypted communication protocol is detected by an evaluation of the at least one rate-based feature and the at least one rate-invariant feature to determine whether the behavior of the ingress traffic intended for the protected entity indicates a potential flood DoS attack using the encrypted communication protocol, wherein the evaluation of the at least one rate-based feature is with respect to at least a first baseline and the evaluation of the at least one rate invariant feature is with respect to at least a second baseline.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
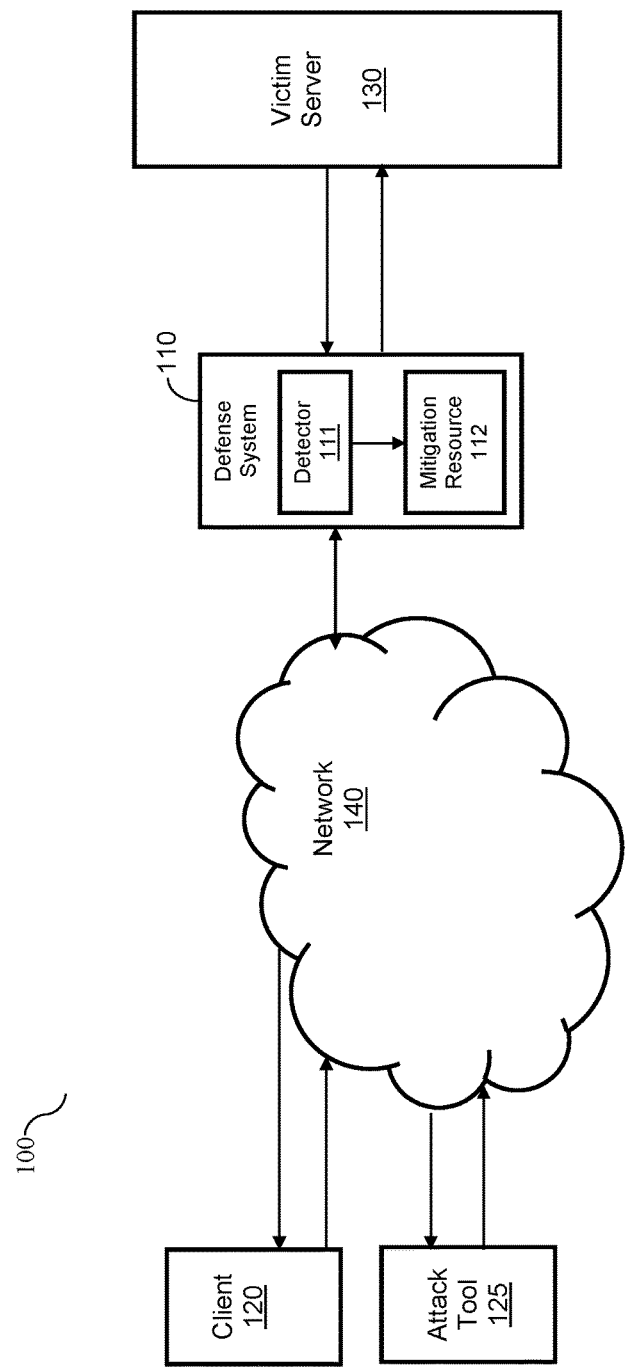
FIG. 1 illustrates an inline deployment of a defense system for detecting HTTPS flood attacks according to one embodiment.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 is a schematic diagram 100 illustrating a defense system 110 for detecting and mitigating HTTPS flood attacks according to some embodiments. In the schematic diagram 100, client devices 120 and 125 communicate with a server 130 over a network 140. In order to demonstrate the disclosed embodiments, the client device 120 is a legitimate client (operated by a real user), the client device 125 is an attack tool (operated, for example, by a bot), and the server 130 is a "victim server", i.e., a server 130 under attack.

The attack tool 125 carries out the malicious attacks against the victim server 130, and particularly carries out HTTPS flood attacks. The attack tool 125 can be a dedicated tool for performing the encrypted attack operating from an infected device. It should be noted that the embodiments disclosed herein are applied when multiple attack tools execute the attacks against the victim server 130 concurrently. Thus, the embodiments disclosed herein can also be used to detect and mitigate a large-scale attack campaign where a vast number of attack tools participate in attacking the protected entity, i.e., the victim server 130. Similarly, vast number of legitimate client devices 120 can operate concurrently to be delivered with the services proposed by the server 130. Both client devices 120 and 125 can reach the victim server 130 concurrently.

The network 140 may be, but is not limited to, a local area network (LAN), a wide area network (WAN), the Internet, a cellular network, and a metropolitan area network (MAN), wireless network, IoT network, or any combination thereof.

Figure 2:
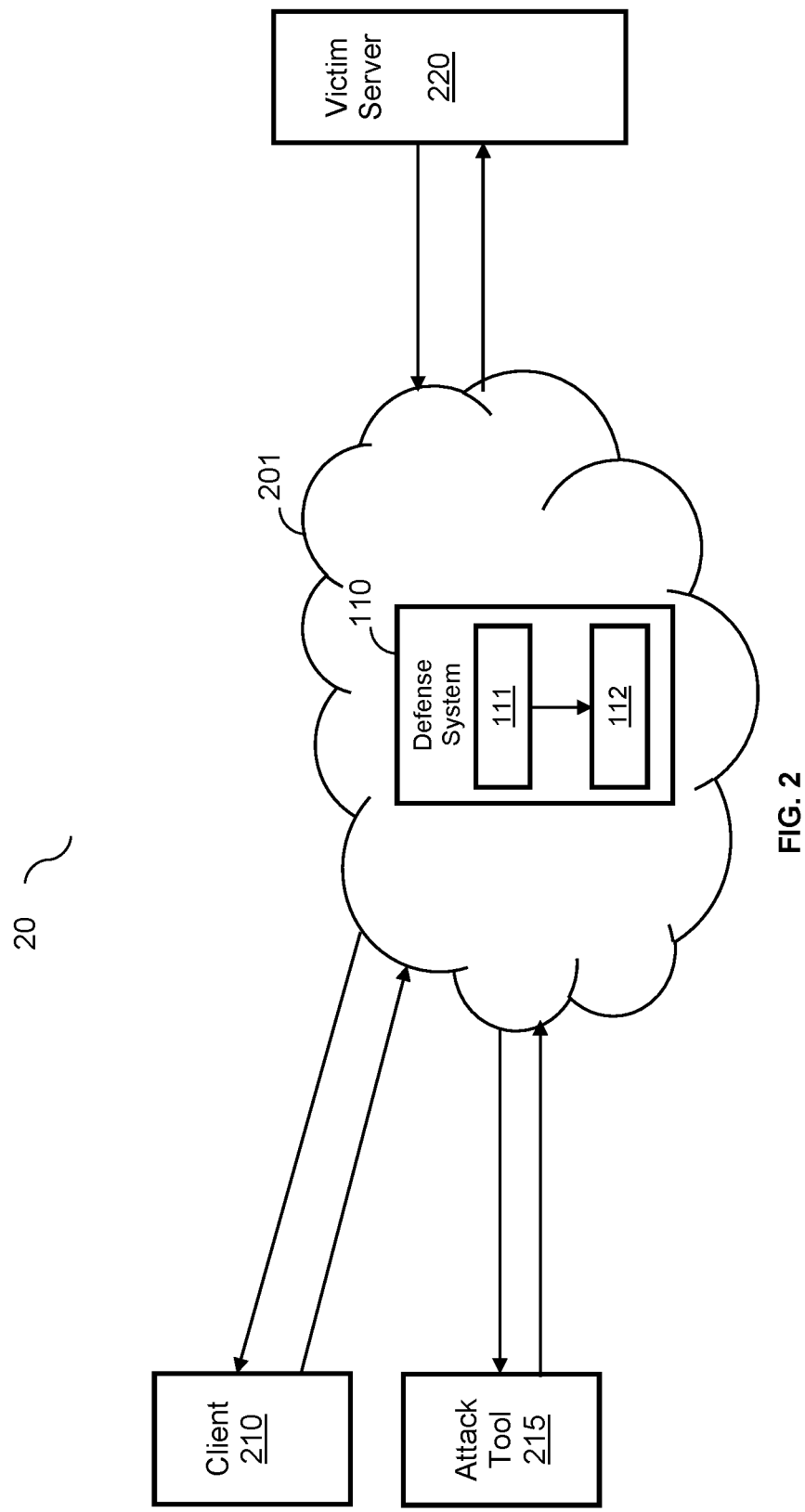
FIG. 2 illustrates an always-on deployment of a defense system for detecting HTTPS flood attacks according to one embodiment.

According to the disclosed embodiments, the defense system 110 is deployed in-line between the client 120, attack tool 125 and victim server 130. The defense system 110 and the victim server 130 may be deployed in a cloud computing platform and/or in an on-premise deployment, such that they collocate together. The cloud computing platform may be, but is not limited to, a public cloud, a private cloud, or a hybrid cloud. Example cloud computing platforms include Amazon® Web Services (AWS), Cisco® Metacloud, Microsoft® Azure®, Google® Cloud Platform, HP® Cloud, and the like. In an embodiment, when installed in the cloud, the defense system 110 may operate as a SaaS. In some configurations, the defense system 110 can also be deployed in a protection cloud platform as shown in FIG. 2, as an always-on protection.

According to the disclosed embodiments, the defense system 110 includes a detector 111 and a mitigation resource 112. The detector 111 in the defense system 110 is configured to inspect traffic flows between the client device 120, attack tool 125 and the victim server 130 to detect encrypted DdoS attacks, and in particular HTTPS flood attacks. In other configurations, only ingress traffic from the client device 120 and attack tool 125 to the server 130 is inspected.

The mitigation resource 112 is configured to perform one or more mitigation actions, triggered by the detector 111, in order to mitigate a detected attack. The mitigation resource may be, but is not limited to, a scrubbing center. In another embodiment, the mitigation resource 112 is a multi-tiered mitigation system. The arrangement, configuration and orchestration of a multi-tiered mitigation system is disclosed in U.S. Pat. No. 9,769,201, assigned to the common assignee, which is hereby incorporated by reference.

The victim server 130 is the entity to be protected from malicious threats. The server 130 may be a physical or virtual entity (e.g., virtual machine, a software container, a serverless function, and the like). The communication with the victim server 130 is over an application-layer cryptographic protocol, such as HTTPS, based on any version of encryption protocol such as SSL, TLS, and the like.

The victim server 130 may be a WEB server (e.g., a server under attack, WEB application under attack, API server, and so on). The attack tool 125 may be, for example, ddosim, LOIC, HULK, PyLoris, GoldeEye and the like. Such tools allow attackers to control HTTP Verbs to be used (GET, POST etc.), rate of HTTP requests, interval between HTTP requests, delay between SYN packets, Source Ips, range and distribution, using WEB proxies for attack distribution, number of concurrent TCP connections, number of sockets, URLs, random URLs to mimic legitimate user behavior, and/or to malform crafted HTTPS requests.

According to the disclosed embodiments, the defense system 110 is configured to inspect egress and ingress traffic from both the client device 120, the attack tool 125, and the victim server 130. The inspected traffic is analyzed to determine abnormal activity based on rate-based and rate-invariant features of the inspected traffic. The rate-based traffic features and the rate-invariant traffic features demonstrate behavior of HTTPS traffic directed to the victim server 130.

Specifically, in an embodiment, several traffic features are defined and utilized: ingress traffic from the client device 120 to the victim server 130 is analyzed to determine a number of HTTPS requests per second: RPS, (as a rate-based feature) and the distribution (average) of HTTPS request size (as a rate-invariant feature). Further, egress traffic, from the victim server 130 to the client device 120 and the attack tool 125, is analyzed to determine the volume of HTTPS response sizes, as the responses number of bytes per second (rate-based features) and the distribution (average) of HTTPS response size (rate-invariant feature).

According to some embodiments, additional traffic features include: an ingress traffic (from a client 120 and attacker 125 to the victim server 130) of HTTPS requests volumes in byte per second (a rate-based feature); ingress/egress ratio measured by the ratio between ingress number of HTTPS requests per second and egress HTTPS response volumes in byte per second (a rate-invariant feature); and egress/ingress measured as the ratio between egress HTTPS response volume in byte per second and ingress number of requests per second (a rate-invariant feature). A traffic feature may be a combination of all the above-noted features.

According to some embodiments, the traffic feature may include computing a histogram reflecting the long-term distribution of the sizes of HTTPS requests and responses. It is assumed that at peace time the normal distribution reflects a stable behavior of legit clients. Each histogram is computed from several bins such that each bin reflects the normalized probability of a request, or response, to appear in each time sample, e.g., 1 second. According to some embodiments, the traffic feature may include a relative variance type of feature (such as a rate-invariant feature). The relative variance may be determined for ingress request per second, relative variance for ingress byte per second, and egress byte per second.

A relative variance (RV) and relative variance baseline (RVBL) are rate-invariant criteria for distinguishing between attack and flash crowds: $RV=<x^2>/<x>^2-1$, where $<\cdot>$ designates averaging, and x is a set of samples in a small sliding window. The RVBL is the reference time series for assessing changes in RV.

The intuition of using relative variance is that during peace time and flash crowd scenarios the web traffic is meant to be very "noisy" in its nature, for example, due to action of browsing a WEB page, reading the WEB page content, and clicking on another link, and so on, all by a large number of independent clients. The attack traffic is less noisy as the attack tool continuously sends HTTPS traffic without any delays and interferences. The relative variance is a kind of measurement to the "variability" of the traffic. In an embodiment, a real time value of the relative variance is measured during a small sliding window. The measured variance is compared against its medium-term baseline. It is expected that during the attack the relative variance is decreased for less than, for example, 50% of the baseline.

As will be discussed below, an attack indication may be generated based on one or a combination of the above-mentioned traffic features. In yet another embodiment, only the traffic from the devices 120, 125 to the victim server 130 is analyzed to determine a number of HTTPS requests per second, and volume of HTTPS requests in bytes per second (as a rate-based feature) and the distribution (average) of HTTPS requests size (as a rate-invariant feature), and also to determine a volume of HTTPS responses in bytes per second (a rate-based feature) and the distribution (average) of HTTPS responses size (rate-invariant feature). This is useful for cases where only ingress traffic flows through the defense system 110. It should be noted that ingress traffic flows through the detector 111 and the mitigation resource 112.

In order to allow simple and efficient detector and mitigator deployment, all such measurements are needed to be analyzed without taking any decryption activity and/or extracting headers of HTTPS requests or responses. Further, the disclosed embodiments allow for eliminating the need for decryption for the task of attack detection, simplifying the implementation of the of the defense system 110, and minimizing the usage of private keys by the defense system 110.

As will be discussed below, HTTPS flood attacks may be detected based on anomalies of each feature or based on a combination of these features. In an embodiment, an anomaly is detected based on baselines generated for the measurement of normal users' behavior, as defined according to the above features. Any deviation that persist for some from the normal baseline is detected as an abnormal event.

The normal behavior may be represented by normal access patterns of the legitimate user using client device 120 to the victim server 130.

The normal behavior, of each feature, can be varied among multiple servers (not shown) and may also has hourly and or weekly behavior patterns. For example, high traffic load can be observed during late morning time, compering to very low traffic volumes during late nighttime or regular working days comparing to weekends. As such, the baseline computation is adapted to hourly changes in traffic, while eliminating attack patterns which are considered to introduce HTTPS floods as fast incensement in the load of traffic, for the ingress or egress traffic. It should be emphasized that a deviation from the normal baselines is defined uniquely for the rate-based and rate-invariant features. Such deviation is detected as an abnormal event.

In an embodiment, upon detection of HTTPS flood attack, a "suspect list" is generated, by the detector 111, as a complementary action of the attack detection. The "suspect list" which includes a list of source Ips of web clients with detected anomaly behavior. The source Ips may be challenged to determine which of the source is a real attacker, an attack tool like 125, or a legitimate client device 120.

A mitigation action may be performed, by the mitigation resource 112, on the attacker. For example, both the client device 120 and the attack tool 125 may be included in the suspect list, but after the challenges, only the attack tool 125 will remain suspect and therefore will be considered as an attacker and its traffic is to be mitigated. The client devices 120 and 125 can be challenged using encrypted client web challenges, such as, but not limited to, a 302 HTTP redirect message, a redirect script, and a CAPTCHA challenge. Examples for such challenges are described in U.S. Pat. No. 8,832,831, assigned to the common assignee and hereby incorporated by reference.

In yet another embodiment, the mitigation action may include limiting the traffic or blocking the traffic completely. The action is performed against traffic originating from the performance of any device listed in the suspect list that has failed the challenge(s).

The building of the suspect list for mitigating attacks is based on the fact that legitimate users may be characterized by a typical access pattern when accessing the victim server 130. The patterns can be characterized by an average rate of HTTPS requests and their volumes and sizes, also by an average volume of responses, the variability of HTTPS requests rate and volumes, the variability of HTTPS responses volumes, the ratio between rate of HTTPS requests (per second) and the volume of HTTPS response. All these traffic features reflected by, for example, the set of URLs which are commonly visited and their sizes as affect the HTTPS requests sizes, cookies patterns that are being used, TLS/SSL headers, the structure of HTTP headers and so on.

In an embodiment, the attack tool generating HTTPS requests, and the corresponding responses, will increase the normal probability of the appearance of specific requests or the sizes of the responses and therefore significantly changes the corresponding size distribution. In yet another embodiment, bins in the histogram that were merely empty at peace time, begin to have a reasonable normalized probability.

In an embodiment, an attacker executing a HTTPS flood attack can reasonably take one, or more, of the following strategies: generate a large number of requests, generate requests for large responses (e.g., request for a video clip), generate requests to abnormal (e.g. smaller or larger, in terms of the size of the HTTPS requests or/and response these URLs introduced, using HTTP Cookie or not) number of URLs, other group of URLs, and the like.

In another embodiment, the attacker can follow other strategies by sending large number of HTTPS POST requests with relatively large size of each of these legitimate like requests. HTTPS POST attack is performed by issuing a large number of encrypted POST requests with relatively large size, of each request.

Detection of HTTPS POST attack may be based on the detection of anomalies at one or more of the following traffic features: a number of HTTPS requests and an ingress BW (measured as a HTTPS requests sizes volume in byte per second) the POST requests impose, distribution of HTTPS request size, relative variance of Ingress byte per second (BPS), and/or a ratio an ingress BPS to an ingress number of HTTPS requests per second (RPS).

It should be noted that an attacker executing a HTTPS flood and its behavior cannot reasonably follow similar statistics patterns as legitimate client devices can. The behaviors of legitimate clients and attackers influence, in a different way, the rates and sizes (distribution) of HTTPS requests and responses and, further, influence the momentary structure of the request size and response size distributions, and the variability of rate and load of HTTPS requests and responses correspondingly.

Therefore, in order to detect HTTPS flood attacks, the defense system 110 is configured to compare features of inspected traffic to the legitimate traffic patterns (or their normal baseline).

Specifically, the inspected traffic features would allow for detecting attacks committed using, for example, the attack strategies mentioned above. The main objective would be to be able to handle HTTPS floods on the ingress side (client to server), the egress side (server to client), or both. That is, the rate-based features would allow for detecting abnormal (e.g., large) number of HTTPS requests and requests to URLs with large responses or even with relatively small responses and many other attack approaches.

In other embodiments, the attacker can choose attack strategies that combine the alternatives mentioned above, or even randomly select an active approach as the attack is progressing over time. The Attacker can start the attack with a large number of HTTPS requests to the victim server main HTML file, and then large number of requests to WEB objects with large HTTPS responses, and then randomly select the URLs to request, and so on.

Further, the rate-invariant features may be utilized to reduce the number of false positive attacks detected in case of "flash crowd". For example, when a website initiates a sale campaign, the number of requests and responses loaded may be increased during the campaign due to legitimate users' activities. Thus, to offset such legitimate activities, rate-invariant features are also considered when determining if the inspected traffic demonstrates an HTTPS flood attack, or that the increase in traffic is due to legitimate increment in traffic and not due to attack tool activities.

The rate-invariant features examine the distribution of the size of the HTTPS requests and responses, the variability of the rate and volume of HTTPS requests and responses correspondingly and the ratio between rate and volume of HTTPS requests and responses (both directions, HTTPS requests per second divided by HTTPS responses sizes per second and the opposite HTTPS responses sizes per second divided by the HTTPS requests per second), the ratio between HTTPS requests volume and HTTPS request rate, and so on. Typically, HTTPS traffic as generated by the attack tool 125, has different appearances "on the wire" as can be observed for legitimate client 120 traffic, generated by WEB browsers or other legitimate user-agents.

Typically, the attack tool 125 do not craft HTTPS requests as legitimate browsers do. That is, attack tools do not add well-crafted HTTP headers, WEB cookies, TLS/SSL headers or designate URLs' typically requested by legitimate users to any, or most, requests or responses. In addition, attacker when activating the attack tool 125 to issue HTTPS floods attack, cannot follow same URL requests pattern as legitimate users do. The overall consequences of all these facts, the average size of HTTPS responses and requests generated by attack tools typically would be different (shorter or larger) than the size of HTTPS requests and responses of legitimate client device. The tools executing HTTPS flood attack would affect the average size, and therefore the distribution, of the generated HTTPS' requests and responses. As a result, the legitimate client's behavior is noisy, and the attack tools issue a relatively constant and stable traffic pattern.

According to the disclosed embodiments, the defense system 110 is configured to determine, or to otherwise compute, normal baselines for each traffic features. The baselines are continuously determined at peace time and during predefined learning periods (e.g., a week, an hour, etc. that used for learning the normal baseline). Once baselines are determined, the defense system 110 is configured to inspect all traffic directed to the victim server 130, compute the relevant traffic features, and determine any deviation of each or combination of traffic features from their respective baselines.

It should be noted that the traffic inspected by the defense system 110 is performed without decrypting the traffic, but rather by gathering traffic telemetrics. Therefore, the defense system 110 does not need to maintain the encryption TLS/SSL, or others, decryption keys utilized by the client device 120 and the victim server 130. The method for detecting HTTPS flood attacks are discussed in detail below.

According to some embodiments, upon detection of an HTTPS flood attack, one or more mitigation actions may be performed. As noted above, the mitigation action may be executed by the mitigation resource 112 in the defense system 110. The mitigation action may be, for example, blocking, or rate-limiting, of traffic from the client 120 to the server, challenge the client causing any traffic anomaly (e.g., CAPTCHA), redirecting the traffic to a scrubbing center for cleaning malicious traffic, and so on. In an embodiment, a mitigation action can start from challenging each entity (client device and/or attack tool) in the suspect list and end with a rate limiting applied on these clients or even blocking of these source Ips.

In the example deployment, the defense system 110 is connected in-line with the traffic between the client device 120 and the attack tool 125 toward the victim server 130. In this deployment, the defense system 110 is configured to process ingress traffic from the client device 120 and the attack tool 125 and egress traffic from the server 130. In yet another embodiment, when deployed in-line, the defense system 110 processes only ingress traffic from the client device 120 and the attack tool 125. The processed traffic is then transparently transferred to its destination (e.g., either the client device 120 and the attack tool 125 or the victim server 130).

It should be noted that although one client device 120, one attack tool 125, and one victim server 130 are depicted in FIG. 1 merely for the sake of simplicity, the embodiments disclosed herein can be applied to a plurality of clients and servers. The clients may be located in different geographical locations. The servers may be part of one or more datacenters, server frames, private cloud, public cloud, hybrid cloud or combinations thereof.

It should be further noted that in an embodiment, the defense system 110 is configured to receive, and thus process, only ingress (and not egress) traffic. Therefore, the defense system 110 needs to support these asymmetric network conditions when handling HTTPS flood attacks.

In some configurations, the victim server 130 may be deployed in a datacenter, a cloud computing platform, or on-premise of organization, and the like. The cloud computing platform may be a private cloud, a public cloud, a hybrid cloud, or any combination thereof. In addition, the deployment shown in FIG. 1 may include a content delivery network (CDN) connected between the client 120 and server 130.

FIG. 2 illustrates an always-on deployment 200 of the defense system 110 according to the disclosed embodiments. In the deployment 200, the defense system 110 is part of a cloud protection platform 201 being connected to a client device 210 and an attack tool 215 and a server 220 (which is the victim server 220) as discussed above. The victim server 220 is the entity to be protected from malicious threats. In an embodiment, the cloud protection platform 201 can be deployed as SaaS by third party cloud vendors.

The communication among the various components illustrated in FIG. 2 is over a network (network) using an application layer cryptographic protocol. Such a network may be, but is not limited to, a LAN, a WAN, the Internet, a cellular network, and a MAN, or any combination thereof. It should be noted that although one client device 210, one attack tool 215 and one victim server 220 are depicted in FIG. 2 merely for the sake of simplicity, the embodiments disclosed herein can be applied to a plurality of clients and servers. The clients may be located in different geographical locations. The server 220 may be part of one or more datacenters, server frames, a cloud computing platform (public, private, or hybrid) or combinations thereof.

The attack tool 215 carries out the malicious attacks against the victim server 220, and particularly carries out HTTPS flood attacks. The attack tool 215 can be a dedicated tool for performing the encrypted attack or can be an infected computing device. Again, it should be noted that the embodiments disclosed herein are applied when multiple attack tools execute the attacks against the victim server 220. Thus, the embodiments disclosed herein can also be used to detect and mitigate a large-scale attack campaign where a vast number of attack tools participate in attacking the protected entity, i.e., the victim server 220.

As noted above, the defense system 110 includes the detector 111 and the mitigation resource 112. According to the various embodiments, traffic between the victim server 220, the client 210 and attack tool 215 is transferred through the cloud defense platform 201. The traffic is inspected by means of the defense system 110. Any detected attack is mitigated within the cloud defense platform 201. Thus, only clean traffic is sent to the server 220.

In an embodiment, the detector 111 of the defense system 110 processes ingress traffic to detect and mitigate HTTPS flood attacks against the protected victim server 220. The detector 111 is configured to perform the various disclosed embodiments to detect HTTPS flood attacks.

The mitigation resource 112 is configured to perform, upon detection of an attack, one or more mitigation actions on traffic from the client 210 and/or attack tool 215 and forward legitimate clean traffic to the server 220. Examples for mitigation actions are discussed above.

In an embodiment, the cloud protection platform 201, and thus the defense system 110 receives, and thus processes only ingress traffic. Therefore, the secured datacenter 201 supports asymmetric network conditions when handling HTTPS flood attacks. It should be further noted that the deployment shown in FIG. 2 may include a content delivery network (CDN) connected between the client 210 and server 220, where the traffic is directed from the client 210.

In another configuration, the cloud protection platform 201 is configured to perform out-of-path mitigation. In such configuration, when attack is detected, traffic is directed from the attack tool 215 and client 210 to the cloud protection platform 201 in order to mitigate the attack. Any clean traffic is forwarded to the victim server 220. An attack can be detected based on telemetries collected and analyzed without directly analyzing the draft.

In yet another configuration, a hybrid deployment of the defense system and the cloud defense platform is provided. In such deployment, a defense system is collocated to the victim server to process in-line traffic. When the defense system cannot efficiently mitigate a detected attack, e.g., due to the volume of the attack, the traffic is directed to the cloud defense platform. Typically, the cloud defense platform would include high-capacity mitigation resources.

Figure 3:
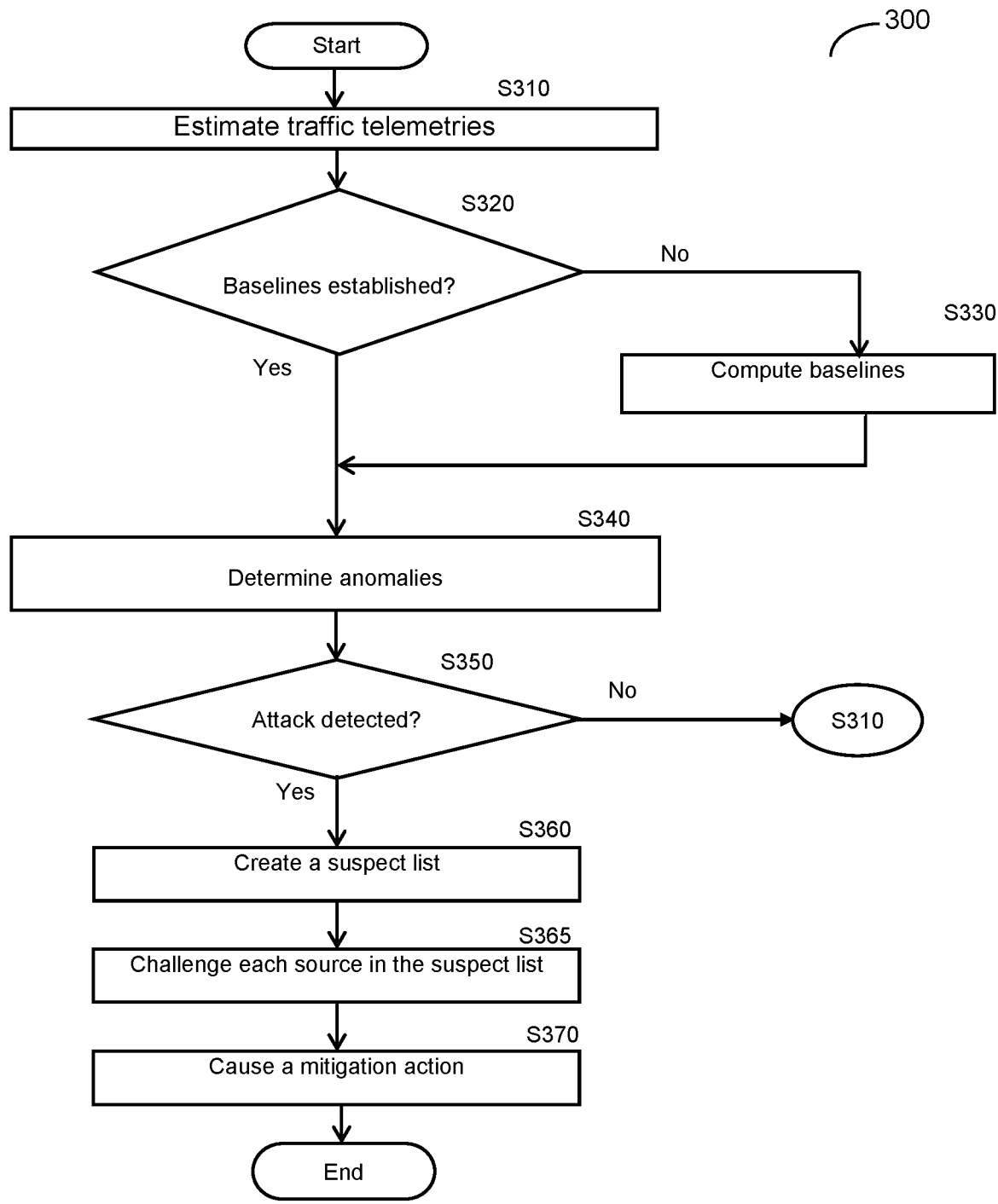
FIG. 3 is a flowchart describing a method for detecting and mitigating HTTPS flood attacks according to some embodiments.

FIG. 3 shows an example flowchart 300 illustrating the detection of HTTPS flood attacks according to an embodiment.

At S310, traffic telemetries are estimated. In an embodiment, S310 includes measuring (or sampling) of ingress (from the client to server) traffic and/or egress traffic (from the server to the client) at predefined time intervals (e.g., 1 second). Then, for each sample, traffic features are estimated. This includes estimating, for example, the total number of HTTPS requests, total volume (bytes) of HTTPS requests, total volume (bytes) of HTTPS responses, list of all requests and their sizes and the source IP generates each request, and list of all responses and their sizes and the source IP target of each response.

As noted above, the detection is performed without decrypting the traffic. Thus, there is no way to determine exactly the number of HTTP requests, their sizes, and the volume of HTTP responses, by merely parsing and examining HTTPS responses as a plain text. As a result, according to the disclosed embodiments, the estimation is based on the synchronous property as dictated by the HTTP version 1.x. When communicating using the HTTP requests, the client sends a single HTTP request and only then the server answers with a response. HTTP communicates over a Transmission Control Protocol (TCP). The information carried in a header of a TCP packet can be utilized to estimate the existence of HTTP request and response, and the size of the response and request. Specifically, the TCP SEQ number and the TCP ACK number designated in the TCP header can be utilized to estimate the size of the request and response, respectively.

In an embodiment, to estimate the required telemetries, for each individual TCP connection, TCP packets including "application data" SSL Records header (content_type=23) are identified. These packets are used to carry TLS application traffic, i.e., the actual HTTPS applicative payloads. Such packets are utilized to estimate telemetry related to the requests. The application data may be composed of a number of IP packets.

To estimate the request size, the progress of a TCP SEQ number is monitored. In an embodiment, the TCP SEQ number designated in the first packet in a HTTP request is subtracted from the TCP SEQ number designated in the last packet of a previous request to estimate the size a current sampled request. To estimate the response size, the TCP ACK number of the current request is subtracted from the most recent TCP ACK number from previous request. It should be noted that TCP ACK reflects the number of bytes received by the client device from server, and thus can reflect the overall bytes HTTPS responses are composed from.

At S320, it is checked if the learning period has elapsed. If so, execution continues with S340; otherwise, at S330, at least one feature baseline is computed for each traffic feature. The learning period may be set to a predefined time window or until enough data is gathered and collected. A baseline is established during peace time or data gathered at peace time, i.e., when no attack traffic is detected.

According to the disclosed embodiments, at least one baseline is continuously computed based on samples of the traffic features to determine normal activity of rate-based and rate-invariant features. Of the inspected traffic. In one embodiment, two types of baselines are computed for each traffic feature, a short-term and long-term baseline.

The traffic features that are utilized to determine the baseline and then determine abnormal activity, respective thereof. The traffic features are rate-based and rate invariant. The rate-based traffic features include: a number of HTTPS requests per second (RPS), an HTTPS response sizes, or volume measured in of bytes per second, and a volume of HTTPS requests measured in byte per second. The rate-invariant features include a distribution of HTTPS requests sizes, a distribution of HTTPS response size, an ingress/egress ratio measured as the ratio between ingress number of HTTPS requests per second and an egress HTTPS response volume measured in byte per second, and an egress/ingress ratio measured as the ratio between an egress HTTPS response volume in byte per second and an ingress number of requests per second.

The rate-invariant features may also include a relative variance. The relative variance may be determined for the ingress request per second, the relative variance for an ingress byte per second, and relative variance for the egress byte per second. A traffic feature may be a combination of all the above-noted features.

The short-term baseline is computed for a short-term, i.e., computes changes that are roughly short in their longevity. The short-term period may be, for example, an hour. The short-term baseline is utilized to follow hourly changes in HTTPS traffic, and therefore detect anomaly caused due to relatively rapid changes in the HTTPS traffic's behavior, as can be observed during attack time. It is valuable to follow hourly changes in traffic in order to eliminate high attack threshold during high and low time periods, and also follow changes is legitimate traffic during busy periods or similar.

The long-term baseline is computed for a long-term, i.e., computer changes that reflects long-term period trends in traffic. The long-term period may be, for example, a week. The long-term baseline is utilized to detect anomaly caused due to slow changes in the traffic's behavior. The long-term baseline compliments the short-term baseline because it can eliminate cases when attackers "slowly" change the attack load that can be computed as legitimate baselines.

In an embodiment, the long-term baseline can be computed using IIR LP filter configured with low-frequency defined pass- and stopband (e.g., order of magnitude 1/week), while the short-term baseline can be computed using IIR LP filter with a higher pass-filter and stopband filter (e.g., an order of magnitude 1/hour and 1/minute, respectively). The two baselines computed for each traffic feature are kept. It should be noted that each baseline is continuously updated.

In an embodiment, the following baseline activities are taken in order to learn the normal behavior of various traffic features. For the rate-based traffic features include: a number of HTTPS requests per second (RPS), an HTTPS response sizes or volume, and a volume of HTTPS requests both short-term and long-term baseline is continuously calculated. For the rate-invariant features the distribution of HTTPS requests sizes histograms, and distribution of HTTPS response size long-term is continuously calculated. For the rate-invariant features ingress/egress ratio and the egress/ingress ratio, the short term-baseline is calculated. For relative variance baseline, for its various traffic features, mid-term to long-term baseline is computed. The next stage, at S340, after baselining of the various rate-based and rate-invariant traffic features, various deviations from these baselines are to be detected as traffic anomalies. In an embodiment, the anomaly detection is performed by dynamic learning, during peace time, of the typical maximal deviation of traffic from its momentary computed baseline. States where real time samples of each traffic features exceed the baseline in amount equal or greater to/from the maximal deviation continuously for some time, are considered as anomaly.

In an embodiment, a baseline threshold may be determined as follows:

$$U(t)=Y(t)+\text{maxDev}$$

where U(t) is an anomaly threshold, Y(t) is the baseline, and maxDev is the maximal deviation of an observed traffic feature during peace time corresponding to the required value of the false positive detections rate of the observed traffic feature. The maxDev is considered as the "legitimate" deviation from the momentary baselines.

The maxDev is continuously computed during the learning period and during peace time, as a measurement for the actual legitimate deviation from the momentary baseline of the various traffic features. The maxDev allows for anomaly detection, as it compare the legitimate deviation in traffic (due to legitimate traffic statistics behavior) to deviations caused by malicious activities. The maxDev is separately computed against the short-term and long-term baselines.

In an embodiment, the maxDev is computed using the measured standard deviation $\sigma$ multiplied by a constant multiplier $\rho$. That is:

$$\text{maxDev}=\rho\sigma$$

As the standard deviation is measured against the various relevant traffic features and others.

The standard deviation is computed during peace time over each of the above-mentioned traffic features for their corresponding baselines. The value of the multiplier p may be related to the desired false positive detections of observed features. In an embodiment, the multiplier $\rho$ is a preconfigured parameter defining the sensitivity.

At S340, once the various traffic features' baselines are computed, the estimated traffic telemetries, or the momentary real time traffic features values, are compared to the baselines to determine anomaly. Each traffic telemetry is established to its respective baselines (both short and long, or short or long separately). An anomaly is detected as a deviation from one of the short-term or long-term baselines. When using the maxDev as a baseline threshold, each sample is compared with baseline threshold U(t). An alert is generated, when samples exceed the threshold several times in a row triggering an alarm.

Following one exemplary embodiment for detecting anomaly, the traffic features are rate-based and rate-invariant features. In an embodiment, rate-based anomaly is detected based on a total number of HTTPS requests and a total volume (bytes) of HTTPS requests and responses. Any variance from the respective baselines are determined as anomaly.

In one embodiment, the anomaly may be computed as deviations from one of the two rate-based baselines as follows:

$$Y_{[t]} > Y_{baseline}\rho^*\sigma$$

In an embodiment, where Y[t] is the current sample, $Y_{baseline}$ is either the short-term or long-term baseline, $\sigma$ is the correspond variance, and p is a preconfigured parameter defining the sensitivity. Anomaly is alarmed only after configurable consecutive detections of such anomalies satisfying the above equation. In an embodiment, a predefined number (e.g., 5 or 10) consecutive detections can be considered as alarm.

In an embodiment, the rate-invariant anomaly is detected based on abnormal distribution of the size of HTTPS requests and responses. In an embodiment, an abnormal distribution is determined based on the probability that a request's size would fit a specific bin. A bin is defined as a single "bucket" in the distribution. Each bin may be configured using two parameters: "BINWidth" which is a system wide static attribute for size of all BINs in distribution, e.g., 128 bytes; and NumOfBINs which is a system wide static attribute for size of all BINs in distribution, e.g., 1024 BINs. The distributions are computed from pre-defined static number of BINs (NumOfBINs), where each BIN is with a pre-defined static Width (BINWidth).

In an embodiment, upon reception of every request (response) with size $\text{ReqSize}_j$, the request (response) entered to a BIN number '1' as follows:

$$I=[\text{ReqSize}_i\text{div}(\text{BINWidth})]\text{mod}(\text{Num\_of\_Bins})$$

The distribution of each BIN is computed for every sample as the total number of requests in a BIN, divided by the total number of requests in the sample. The distribution of each bin reflects the overall probability of an individual HTTPS request, or response accordingly, to appear in a specific bin.

During peace time a baseline is continuously computed over each bin probability in order to build the baseline distribution. The baseline is calculated as a long-term baseline.

In an example embodiment, anomaly is detected when a BIN value computed for current traffic ("real-time distribution") is different (larger or smaller) than the value of the same BIN as computed during a learning period ("baseline distribution"). Alternatively, an anomaly is detected when a number of active BINs is the real-time distribution is higher than the average number of BINs in the baseline distribution.

In yet another embodiment, another rate-invariant feature is computed as a ratio between ingress HTTPS request per second to egress responses volumes in byte per second is maintained. For this feature, a short-term baseline and appropriate MaxDev are computed to determine a normal peace time deviation and cases of anomalies, in a similar means as per other traffic features. This attribute is assumed to be relatively large under attacks reflecting unproportionally, comparing to peace time, small responses and remain almost unchanged in flash crowd.

In yet another embodiment, another rate-invariant feature is computed as the ratio between egress HTTPS response volume in byte per second to ingress HTTPS request per second is maintained. A short-term baseline and appropriate MaxDev threshold are computed to determine a normal peace time deviation and cases of anomalies, in a similar mean as per other traffic features. This attribute is assumed to be relatively large under attacks reflecting unproportionally, comparing to peace time, small responses and remain almost unchanged in flash crowd.

In yet another embodiment, another a rate invariant feature is computed as the relative variance for an ingress number of HTTPS requests per second. The baseline is computed as a short-term baseline over this feature. The real-time value of relative variance is computed all time, including attack, and compared to the short-term baseline to the relative variance feature. In an example, if this value is at least 50% less than corresponding baseline value, then anomaly is detected.

In yet another embodiment, another rate invariant feature is computed as the relative variance for an ingress volume of HTTPS requests per second. The baseline is computed as a short-term baseline over this feature. The real-time value of relative variance is computed all time, including attack, and compared to the short-term baseline of the relative variance. In an example, if this value is at least 50% less than corresponding baseline value, then anomaly is detected.

In yet another embodiment, another rate invariant feature is computed as the relative variance for an egress volume of HTTPS responses per second. The baseline is computed as a short-term baseline over this feature. The real-time feature of relative variance is computed all time, including attack, and compared to the short-term baseline to of the relative variance. In an example, if this value is at least 50% less than corresponding baseline value, then anomaly is detected.

At S350, based on the anomaly indications (detected anomalies) it is determined if an HTTPS flood attack is currently on-going. If so, execution continues with S360; otherwise, execution returns to S310. An attack is detected when anomaly is measured on both at least one rate-based traffic features and the at least one rate-invariant traffic features. In an embodiment, HTTPS floods DdoS attack is detected when anomaly is detected in ingress HTTPS requests per second or ingress HTTPS requests volume or egress HTTPS response volume, and when anomaly is detected in a ratio between ingress HTTPS requests rate and egress HTTPS response volume or in ratio between egress HTTPS response volume to ingress HTTPS requests rate or relative variance in ingress HTTPS requests rate or relative variance in ingress HTTPS requests volumes or relative variance in egress HTTPS volume or in HTTPS requests sizes distribution or in HTTPS responses size distribution.

At S360, upon detection of an attack, a "suspect list" which may include a list of source Ips of client devices that trigged detection of anomalies is created. At S635, each client in the suspect list is challenged to determine if the client device is a bot or operate by a real user. At S370, causing execution of at least one mitigation action on each client device determined to be an attack tool. The mitigation action may include generating alerts, causing the client to perform a compute challenge, redirecting traffic from the client to a scrubbing center, blocking client traffic, and so on, or a combination thereof.

In an embodiment, the suspect list is generated based on HTTPS requests size distribution and HTTPS response distribution. Client IP sources that their HTTPS requests, or responses, are part of anomalous bin in the histogram and therefore considered as candidate to the "suspect list".

In an embodiment, source Ips with large rate of HTTPS requests, or large volumes of HTTPS response, comparing to legitimate rate are considered as candidate to the "suspect list". In cases the anomalous values returned to their normal values the attack is terminated.

Figure 4:
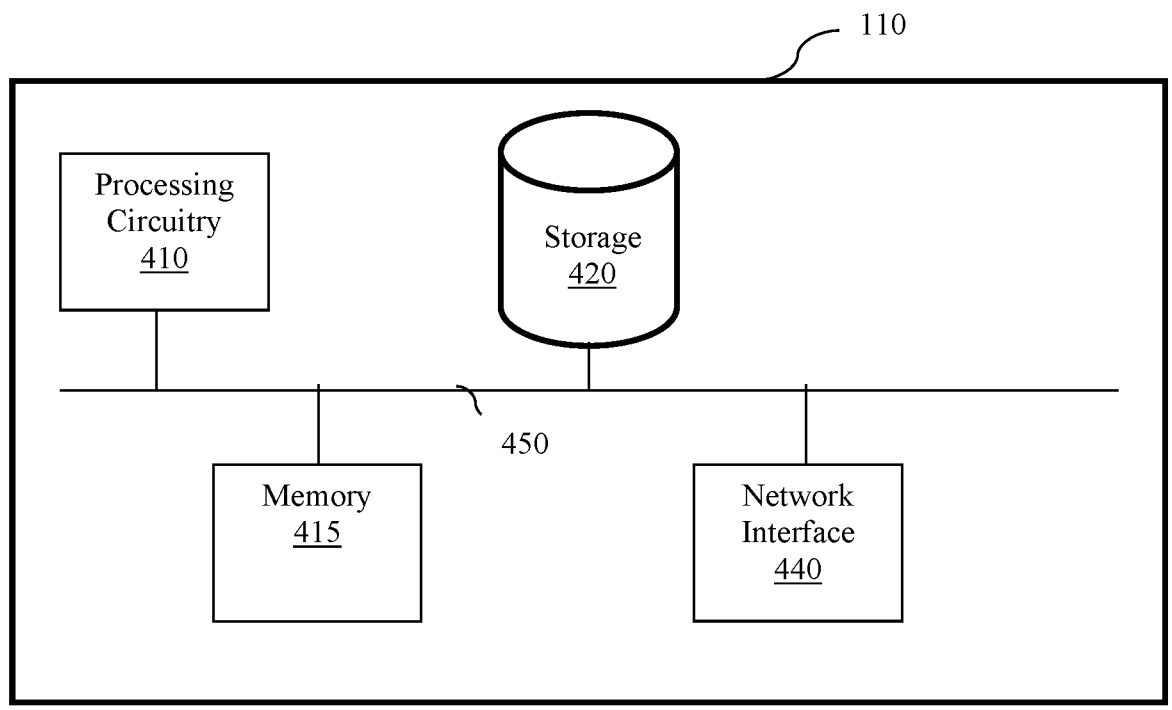
FIG. 4 is a block diagram of the defense system for detecting and mitigating encrypted attacks according to one embodiment.

FIG. 4 is an example block diagram of the defense system 110 implemented according to an embodiment. The defense system 110 includes a processing circuitry 410 coupled to a memory 415, a storage 420, and a network interface 440. In another embodiment, the components of the defense system 110 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 415 may be volatile (e.g., RAM, etc.), non-volatile (e.g., ROM, flash memory, etc.), or a combination thereof. In one configuration, computer readable instructions to implement one or more embodiments disclosed herein may be stored in the storage 420.

In another embodiment, the memory 415 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to perform the embodiments described herein.

The storage 420 may be magnetic storage, optical storage, and the like, and may be realized, for example, as flash memory or other memory technology, CD-ROM, Digital Versatile Disks (DVDs), or any other medium which can be used to store the desired information. The storage 420 may include workflow schemes as described herein.

The processing circuitry 410 is configured to detect and cause mitigation of HTTPS flood attacks, and any encrypted DdoS attacks as described herein.

The network interface 440 allows the defense system 110 to communicate at least with the servers and clients. It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents I.e. both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for detecting and mitigating denial-of-service (DoS) attacks that are using an encrypted communication protocol, comprising:
    estimating traffic telemetries of packets of at least ingress traffic passing over an insecure network that is directed to a protected entity by analyzing transmission control protocol (TCP) headers of the packets, the packets of the at least ingress traffic being secured using an encrypted version of a non-encrypted communication protocol, the packets of the at least ingress traffic being intended for the protected entity;
    providing at least one rate-based feature and at least one rate-invariant feature based on the estimated traffic telemetries, wherein the rate-based feature and the rate-invariant feature demonstrate a normal behavior of the traffic using the encrypted protocol intended for the protected entity; and
    executing a mitigation action when a potential flood DoS attack using the encrypted communication protocol is detected by an evaluation of the at least one rate-based feature and the at least one rate-invariant feature to determine whether the behavior of the ingress traffic intended for the protected entity indicates a potential flood DoS attack using the encrypted communication protocol, wherein the evaluation of the at least one rate-based feature is with respect to at least a first baseline and the evaluation of the at least one rate-invariant feature is with respect to at least a second baseline.

2. The method of claim 1, wherein estimating traffic telemetries further comprises:
    estimating traffic telemetries of packets of egress traffic passing over the insecure network that are from the protected entity by analyzing TCP headers of the packets of the egress traffic, the packets of the egress traffic using the encrypted version of the non-encrypted communication protocol.

3. The method of claim 2, wherein the evaluation of the at least one rate-based feature and the at least one rate-invariant feature is performed without decrypting any of the ingress traffic and the egress traffic.

4. The method of claim 2, wherein estimating the traffic telemetries further comprises:
    estimating a number of requests per second using the encrypted version of the non-encrypted protocol communication in the ingress traffic, a size in bytes of a request using the encrypted version of the non-encrypted protocol communication in the ingress traffic, and a size in bytes of a response in the egress traffic to the request, the estimating being based on a TCP sequence (SEQ) number of a plurality of TCP packets.

5. The method of claim 2, wherein evaluation of the at least one rate-invariant feature further comprises:
    estimating request size using the encrypted version of the non-encrypted protocol communication in the ingress traffic, a size in bytes of a request using the encrypted version of the non-encrypted protocol communication in the ingress traffic, and a size in bytes of a response in the egress traffic to the request the estimating being based on a TCP acknowledgement (ACK) number of a plurality of TCP packets.

6. The method of claim 1, wherein the non-encrypted protocol is hypertext transfer protocol (HTTP), and the encrypted version of the non-encrypted communication protocol is hypertext transfer protocol secure (HTTPS).

7. The method of claim 1, further comprising:
    computing the at least first baseline for the at least one rate-based feature and the at least second baseline for the at least one rate-invariant feature.

8. The method of claim 7, wherein the at least first baseline includes: a short-term baseline and a long-term baseline, wherein the short-term baseline characterizes short-term changes in the ingress traffic and the long-term baseline characterizes changes in the ingress traffic over a long-term than the short-term.

9. The method of claim 7, wherein the at least second baseline includes: a short-term baseline and a long-term baseline, wherein the short-term baseline characterizes short-term changes in the ingress traffic and the long-term baseline characterizes changes in the ingress traffic over a long-term than the short-term.

10. The method of claim 1, wherein the behavior of the at least ingress traffic using an encrypted version of a non-encrypted communication protocol indicates a potential flood DoS attack when anomalies are detected on at least one rate-based feature and on at least one rate invariant feature.

11. The method of claim 10, wherein executing the mitigation action further comprises:
generating a suspect list including a list of source internet protocol (IP) addresses of client devices that triggered the detected anomalies;
challenging each of the client devices in the suspect list; and
executing the mitigation action on traffic originated from any device client that fails the challenge.

12. The method of claim 1, wherein the method is performed by a defense system including at least a detector for detecting the potential flood DoS attack and a mitigation resource for executing the mitigating action.

13. The method of claim 1, wherein the evaluation of the at least one rate-based feature and the at least one rate-invariant feature with respect to at least one baseline further comprises:
comparing real-time samples of the at least one rate-based feature to the at least first baseline and comparing the at least one rate-invariant feature to the at least second baseline; and
detecting a potential flood DoS attack using the encrypted communication protocol is detected when at least one of: the at least one rate-based feature and at least one rate-invariant feature deviates from their respective at least one baseline, wherein the deviation from the at least one respective baseline is by a threshold.

14. The method of claim 13, wherein the threshold is dynamically updated based on real-time estimation of the traffic telemetries.

15. The method of claim 13, further comprising:
detecting rate-invariant anomaly based on at least abnormal distribution of size of HTTPS requests and responses.

16. The method of claim 13, further comprising:
detecting rate-based anomaly based on at least a total number of ingress requests per second using the encrypted version of the non-encrypted communication protocol and a total volume of bytes of ingress requests per second using the encrypted version of the non-encrypted communication protocol and egress responses total volume of bytes per second using the encrypted version of the underlying communication protocol.

17. A non-transitory computer readable medium having stored thereon instructions for causing a processing circuitry to execute a process for detecting denial-of-service (DoS) attacks using an encrypted communication protocol, comprising:
estimating traffic telemetries of packets of at least ingress traffic passing over an insecure network that is directed to a protected entity by analyzing transmission control protocol (TCP) headers of the packets, the packets of the at least ingress traffic being secured using an encrypted version of a non-encrypted communication protocol, the packets of the at least ingress traffic being intended for the protected entity;
providing at least one rate-based feature and at least one rate-invariant feature based on the estimated traffic telemetries, wherein the rate-based feature and the rate-invariant feature demonstrate a normal behavior of the traffic using the encrypted protocol intended for the protected entity; and
executing a mitigation action when a potential flood DoS attack using the encrypted communication protocol is detected by an evaluation of the at least one rate-based feature and the at least one rate-invariant feature to determine whether the behavior of the ingress traffic intended for the protected entity indicates a potential flood DoS attack using the encrypted communication protocol, wherein the evaluation of the at least one rate-based feature is with respect to at least a first baseline and the evaluation of the at least one rate-invariant feature is with respect to at least a second baseline.

18. A system for detecting denial-of-service (DoS) attacks using an encrypted communication protocol, comprising:
a processing circuitry; and
a memory, the memory containing instructions that, when executed by the processing circuitry, configure the system to:
estimate traffic telemetries of packets of at least ingress traffic passing over an insecure network that is directed to a protected entity by analyzing transmission control protocol (TCP) headers of the packets, the packets of the at least ingress traffic being secured using an encrypted version of a non-encrypted communication protocol, the packets of the at least ingress traffic being intended for the protected entity;
provide at least one rate-based feature and at least one rate-invariant feature based on the estimated traffic telemetries, wherein the rate-based feature and the rate-invariant feature demonstrate a normal behavior of the traffic using the encrypted protocol intended for the protected entity; and
execute a mitigation action when a potential flood DoS attack using the encrypted communication protocol is detected by an evaluation of the at least one rate-based feature and the at least one rate-invariant feature to determine whether the behavior of the ingress traffic intended for the protected entity indicates a potential flood DoS attack using the encrypted communication protocol, wherein the evaluation of the at least one rate-based feature is with respect to at least a first baseline and the evaluation of the at least one rate-invariant feature is with respect to at least a second baseline.

19. The system of claim 18, wherein estimating traffic telemetries further comprises:
estimating traffic telemetries of egress traffic passing over an insecure network that is from the protected entity by analyzing TCP headers of the packets of the egress traffic, the packets of the egress traffic using the encrypted version of the underlying communication protocol.

20. The system of claim 19, wherein the evaluation of the at least one rate-based feature and the at least one rate-invariant feature is performed without decrypting any of the ingress traffic and the egress traffic.

21. The system of claim 18, wherein the evaluation of the at least one rate-based feature and the at least one rate-invariant feature with respect to at least one baseline further comprises:
comparing real-time samples of the at least one rate-based feature and at least one rate-invariant feature to the at least one baseline; and
detecting an anomaly when at least one of: the at least one rate-based feature and at least one rate-invariant feature deviates from the at least one baseline, wherein the deviation from the at least one baseline is by a threshold.

* * * * *